(12) United States Patent
Hidaka

(10) Patent No.: US 10,569,575 B2
(45) Date of Patent: Feb. 25, 2020

(54) IMAGE FORMING APPARATUS, CONTROL APPARATUS, CONTROL METHOD IN IMAGE FORMING APPARATUS, AND STORAGE MEDIUM

(71) Applicant: CANON KABUSHIKI KAISHA, Tokyo (JP)

(72) Inventor: Keita Hidaka, Tsukuba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/212,825

(22) Filed: Dec. 7, 2018

(65) Prior Publication Data

US 2019/0202219 A1 Jul. 4, 2019

(30) Foreign Application Priority Data

Dec. 28, 2017 (JP) .................. 2017-254148

(51) Int. Cl.
    *B41J 13/00* (2006.01)
    *B41J 11/00* (2006.01)
    *G06F 3/12* (2006.01)

(52) U.S. Cl.
    CPC ......... *B41J 13/0009* (2013.01); *B41J 11/008* (2013.01); *B41J 11/0095* (2013.01); *B41J 13/009* (2013.01); *B41J 13/0018* (2013.01); *B41J 13/0027* (2013.01); *G06F 3/1215* (2013.01)

(58) Field of Classification Search
CPC .. B41J 11/0095; B41J 13/0018; B41J 11/008; B41J 13/0027; B41J 13/009; G06F 3/1215

See application file for complete search history.

(56) References Cited

U.S. PATENT DOCUMENTS

| | | | |
|---|---|---|---|
| 6,999,194 B2* | 2/2006 | Kurihara | B41J 11/42 347/19 |
| 9,278,565 B2* | 3/2016 | Imafuku | B41J 13/0009 |
| 9,864,937 B2 | 1/2018 | Saito | |

FOREIGN PATENT DOCUMENTS

JP      2016-215451 A    12/2016

* cited by examiner

*Primary Examiner* — Julian D Huffman
(74) *Attorney, Agent, or Firm* — Venable LLP

(57) ABSTRACT

It is possible to more securely reduce the printing time of printing processing to perform printing while conveying printing sheets in an overlapping manner. An image forming apparatus including: a determination unit configured to analyze print data for printing an image on one printing sheet and to determine, based on the analysis results, an overlap amount of the one printing sheet and another printing sheet conveyed in a state of overlapping part of the one printing sheet; and a conveyance unit configured to convey the one printing sheet and the other printing sheet in an overlapping manner in accordance with an overlap amount determined by the determination unit, and a target image range of the analysis of the print data is determined in accordance with a predetermined overlap amount determined in advance, which a printing unit can permit.

11 Claims, 9 Drawing Sheets

IMAGE FORMING APPARATUS, CONTROL APPARATUS, CONTROL METHOD IN IMAGE FORMING APPARATUS, AND STORAGE MEDIUM

BACKGROUND OF THE INVENTION

Field of the Invention

The present invention relates to an image forming apparatus capable of conveying printing sheets in an overlapping manner.

Description of the Related Art

In performing printing for a plurality of printing sheets in an image forming apparatus, in a case where printing sheets are conveyed one by one with an interval therebetween, the printing time lengthens accordingly. Consequently, a technique has been proposed that reduces the printing time by reducing the interval. Further, a technique has also been proposed that further reduces the printing time by conveying a subsequent printing sheet (hereinafter, called a subsequent sheet) of a preceding printing sheet (hereinafter, called a preceding sheet) with part of the subsequent sheet overlapping the preceding sheet (see Japanese Patent Laid-Open No. 2016-215451).

As described in Japanese Patent Laid-Open No. 2016-215451, in a case where printing sheets are conveyed in an overlapping manner, it is necessary to determine a non-print area where printing is not performed by analyzing print-target images in order to determine an amount (length in the conveyance direction) by which the preceding sheet and the subsequent sheet overlap. Hereinafter, the amount by which the preceding sheet and the subsequent sheet overlap is called a sheet overlap amount or simply an overlap amount.

However, in a case where determination of a non-print area is performed for the entire range of a print-target image, the analysis time is increased, and therefore, it is no longer possible to sufficiently reduce the time taken for the entire printing processing. In particular, it is inefficient to perform the determination of a non-print area for the entire range of an image despite that the print-target image is a white sheet image. Consequently, in order to reduce the printing time in the printing processing to perform printing while conveying printing sheets in an overlapping manner, it is necessary to efficiently perform the determination of a non-print area.

Consequently, an object of the present invention is to provide an image forming apparatus capable of more securely reducing the printing time of printing processing to perform printing while conveying printing sheets in an overlapping manner.

SUMMARY OF THE INVENTION

The image forming apparatus according to the present invention is an image forming apparatus capable of conveying a plurality of printing sheets in an overlapping manner to a printing unit, the image forming apparatus including: a determination unit configured to analyze print data for printing an image on one printing sheet and to determine, based on the analysis results, an overlap amount of the one printing sheet and another printing sheet conveyed in a state of overlapping part of the one printing sheet; and a conveyance unit configured to convey the one printing sheet and the other printing sheet in an overlapping manner in accordance with an overlap amount determined by the determination unit, and a target image range of the analysis of the print data is determined in accordance with a predetermined overlap amount determined in advance, which the printing unit can permit.

Further features of the present invention will become apparent from the following description of exemplary embodiments with reference to the attached drawings.

DESCRIPTION OF THE EMBODIMENTS

In the following, embodiments of the present invention are explained by using the drawings. The following embodiments are not intended to limit the present invention according to the scope of the claims and all combinations of features explained in the present embodiments are not necessarily indispensable to the solution of the present invention.

First Embodiment

Figure 1:
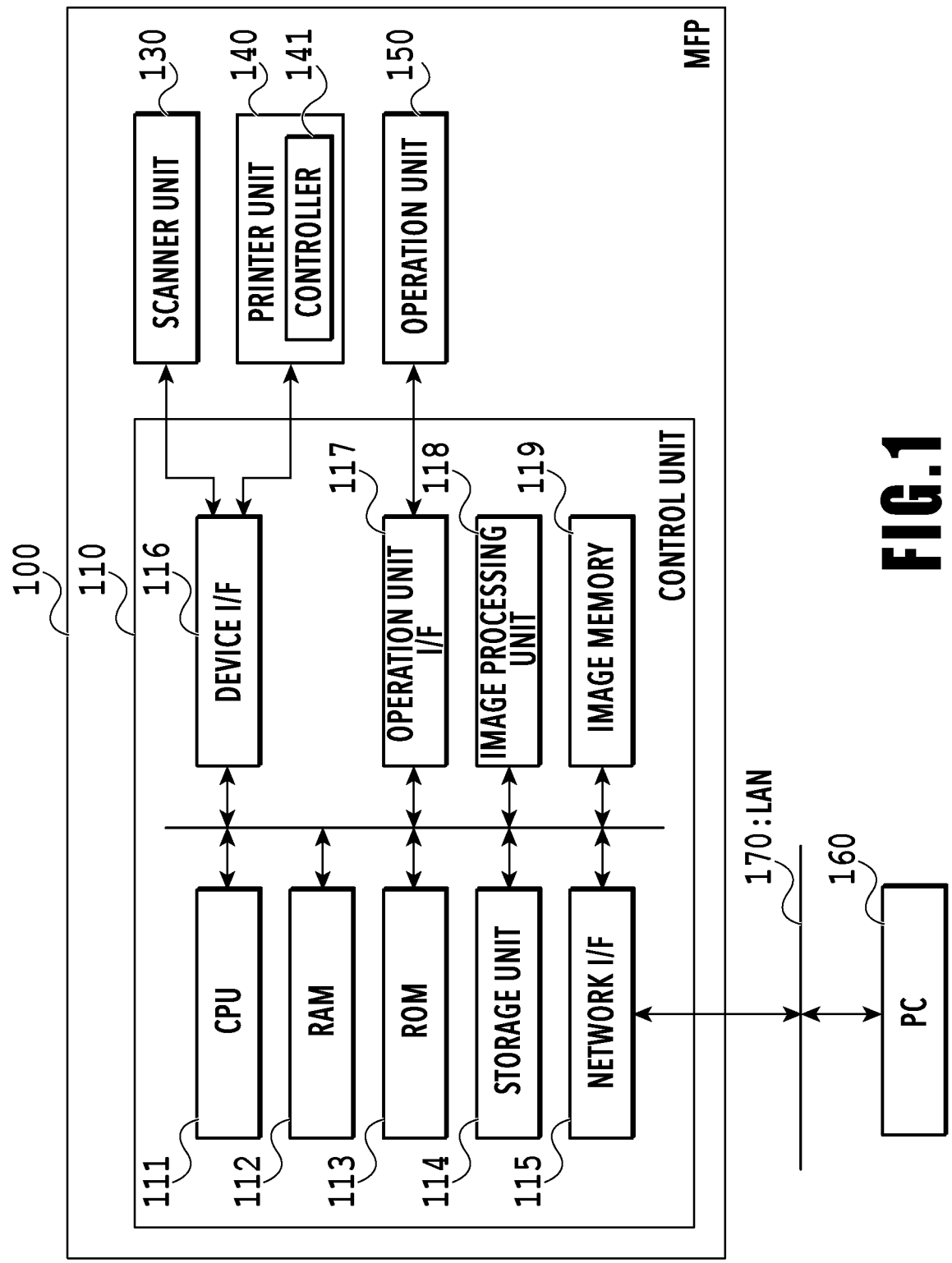
FIG. 1 is a block diagram showing an example of a configuration of an image forming apparatus according to a first embodiment.

FIG. 1 is a block diagram showing an example of a configuration of an MFP (Multi Function Peripheral) used as an image forming apparatus according to a first embodiment. An MFP 100 includes a control unit (also called a control apparatus) 110, a scanner unit 130, a printer unit 140, and an operation unit 150. The control unit 110 has a CPU 111, a RAM 112, and a ROM 113. Further, the control unit 110 includes a storage unit 114, a network I/F (InterFace) 115, a device I/F 116, an operation unit I/F 117, an image processing unit 118, and an image memory 119. The printer unit 140 has a controller 141.

The control unit 110 is connected with the scanner unit 130, which is an image input device, and the printer unit 140, which is an image output device, and controls input and output of image information. Further, the control unit 110 is connected to a LAN (Local Area Network) and performs reception and the like of a print job including PDL (Page Description Language) data via the LAN. The CPU 111 controls the operation of the MFP 100 and operates based on programs stored in the RAM 112. The ROM 113 is a boot ROM and in which a boot program of the system is stored. The storage device 114 is a storage device, such as an HDD (Hard Disk Drive), and in which system software, image data, programs for controlling the operation of the MFP 100, and so on are stored. The program stored in the storage unit 114 is loaded onto the RAM 112. The CPU 111 controls the operation of the MFP 100 based on the program loaded onto the RAM 112. The network I/F 115 is connected to the LAN and performs communication with an external device, such as a PC (Personal Computer) 160, via a network and governs input and output of various kinds of information. The device I/F 116 connects the scanner unit 130, which is an image input device, and the printer unit 140, which is an image output device, with the control unit 110 and performs synchronous system/asynchronous system conversion of image data. The operation unit I/F 117 is an interface that connects the operation unit 150 and the control unit 110 and outputs image data that is displayed on the operation unit 150 to the operation unit 150. Further, the operation unit I/F 117 transmits information input by a user from the operation unit 150 to the CPU 111. The operation unit 150 is a user interface unit having an input/output unit configured to input and output various kinds of information. It may also be possible for the operation unit 150 to have a user interface unit having a display unit and in which the display unit and the input/output unit are integrated into one unit. The image processing unit 118 performs image processing for image data received via the LAN, performs image processing for image data input and output from the device I/F 116, and so on. The image memory 119 is a memory for temporarily loading image data to be processed by the image processing unit 118.

Figure 2:
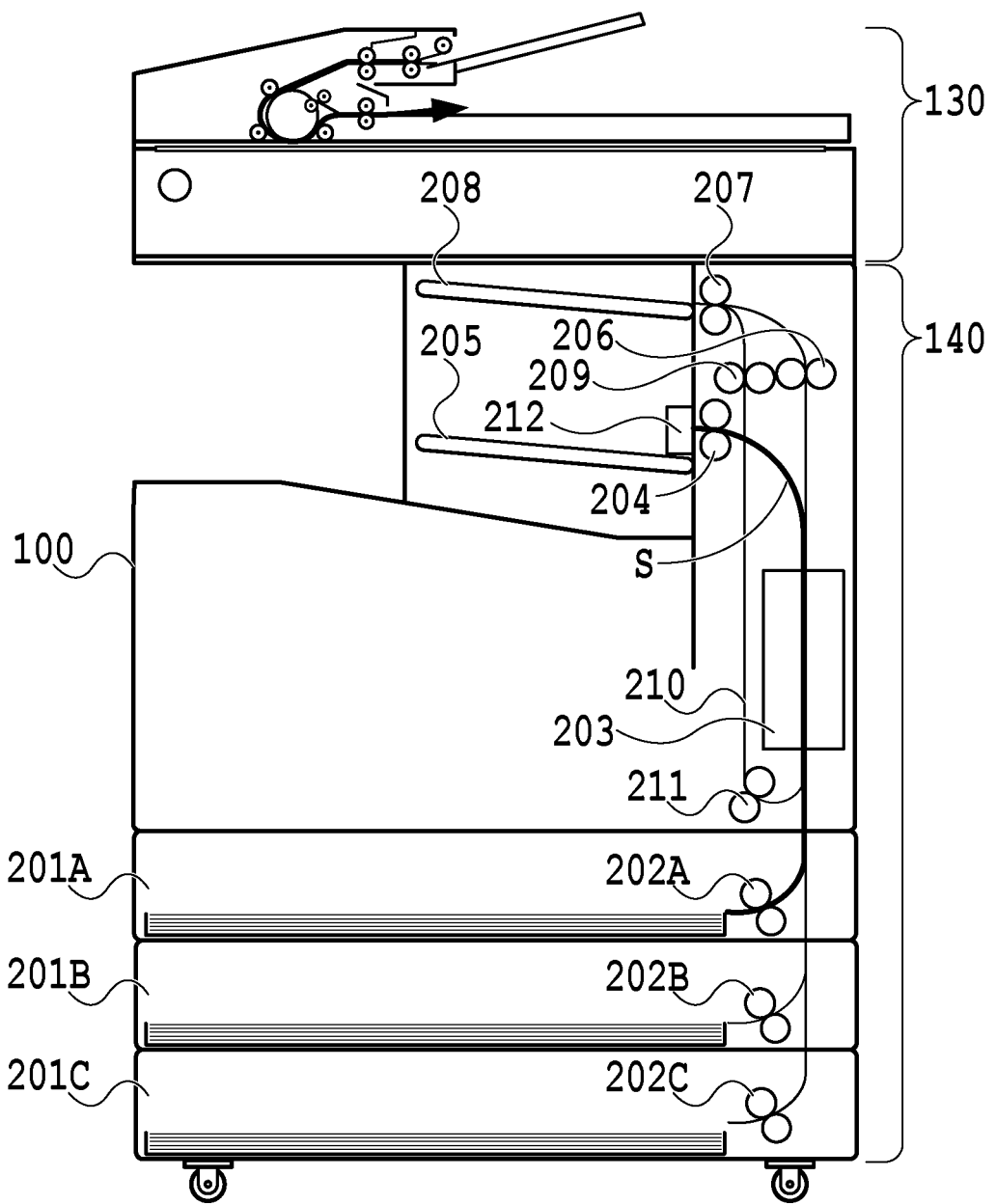
FIG. 2 is an external appearance diagram of an MFP.

FIG. 2 is an external appearance diagram of the MFP 100. In the MFP 100, the scanner unit 130 is arranged on the top of the printer unit 140. The printer unit 140 includes sheet feed units 201 (201A, 201B, 201C) storing printing sheets, conveyance rollers 202 (202A, 202B, 202C) corresponding to the respective sheet feed units, and an image forming unit 203. Further, the printer unit 140 includes a conveyance roller 204, a discharged sheet tray 205, feed rollers 206 and 207, a discharged sheet tray 208, a feed roller 209, a double-sided printing conveyance path 210, a conveyance roller 211, and a stapling device 212. These components are controlled by the controller 141. In FIG. 2, the three sheet feed units are illustrated, but the printer unit 140 may include any number of sheet feed units.

The conveyance roller 202 feeds a printing sheet S stored in the sheet feed unit 201 to the image forming unit 203. At this time, in a case where a sheet overlap amount is set, as will be described later, at timing at which part of a subsequent printing sheet overlaps a preceding printing sheet, the subsequent printing sheet is fed. Due to this, the preceding printing sheet and the subsequent printing sheet are conveyed to the image forming unit 203 in the state where part of the subsequent printing sheet overlaps the preceding printing sheet. The image forming unit 203 forms (prints) an image on the printing sheet S that is fed. The image forming unit 203 may adopt the ink jet method that prints an image by spraying ink onto a printing sheet or the electrophotographic method that prints an image by fixing toner onto a printing sheet. In FIG. 2, the image forming unit 203 is installed vertically (so that the conveyance direction is the vertical direction), but the image forming unit 203 may be installed not vertically. For example, the image forming unit 203 may be installed horizontally (so that the conveyance direction is the horizontal direction). The printing sheet S on which an image is printed by the image forming unit 203 is discharged onto the discharged sheet tray 205 through the conveyance roller 204. In a case where double-sided printing is specified, the printing sheet is once sent to the discharged sheet tray 208 via the feed rollers 206 and 207, not via the conveyance roller 204. The printing sheet sent to the discharged sheet tray 208 is sent to the double-sided printing conveyance path 210 by the feed roller 207 and the feed roller 209 that rotate in the opposite direction. The printing sheet sent to the double-sided printing conveyance path 210 is conveyed again to the image forming unit 203 by the conveyance roller 211 provided on the upstream side of the double-sided printing conveyance path 210. The stapling device 212 staples printing sheets output onto the discharged sheet tray 205.

FIG. 3A to FIG. 3D are diagrams for explaining the internal configuration of the image forming unit 203 and the sheet overlap control in the image forming unit 203. Here, the electrophotographic image forming unit installed horizontally (so that the conveyance direction is the horizontal direction) within the MFP 100 is taken as an example. In FIG. 3A to FIG. 3D, the leftward direction (leftward direction in a case of facing the drawing) is the conveyance direction (sub scanning direction).

As shown in FIG. 3A to FIG. 3D, the image forming unit 203 has a laser scanner 301, a photoconductor drum 302, which is an image carrier, a mirror 303, a development counter 304, a transfer electrifier 305, a conveyance belt 306, and a fixing device 307. Then, at the time of image formation, first, a laser ray output from the laser scanner 301 is reflected from the mirror 303 and an exposure position 302a on the photoconductor drum 302 rotating in the clockwise direction (direction indicated by arrows in FIG. 3A to FIG. 3D) is irradiated with the laser ray. Due to this, a latent image is formed on the photoconductor drum 302. The latent image thus formed on the photoconductor drum 302 is visualized as a toner image by the development counter 304. Next, the visualized toner image on the photoconductor drum 302 is transferred onto a printing sheet by the transfer electrifier 305 at a transfer section 302b. Further, the printing sheet onto which the toner image is transferred is conveyed to the fixing device 307 by the conveyance belt 306 and the transferred image is permanently fixed in the fixing device 307. Then, the printing sheet is discharged onto the discharged sheet tray 205 from the fixing device 307 through the conveyance roller 204. In a case where double-sided printing is specified, the printing sheet is discharged onto the discharged sheet tray 208 from the fixing device 307 through the feed rollers 206 and 207.

It is possible for the image forming unit 203 in the present embodiment to convey a preceding sheet in a state of being overlapped by part of a subsequent sheet to the transfer section 302b. Further, the image forming unit 203 has suction fans F1 and F2 and it is possible to switch an overlapping state of a preceding sheet and a subsequent sheet to another state by the controller 141 controlling the suction fans F1 and F2. The suction fans F1 and F2 are provided on conveyance guides 313 and 314 arranged in opposition to each other between a resisting roller 311 and the transfer section 302b. Further, it is possible for the suction fans F1 and F2 to control generation of a suction force by switching between on and off. As will be described later, the controller 141 drives one of the upper side suction fan F1 and the lower side suction fan F2 (in the present embodiment, the upper side suction fan F1) based on information indicating the overlap amount (sheet overlap amount information) transmitted from the control unit 110. Further, the controller 141 controls a resisting roller motor (not shown schematically) so as to change the sheet conveyance speed by the resisting roller 311. In this manner, the sheet overlap control is performed.

Figure 3A:
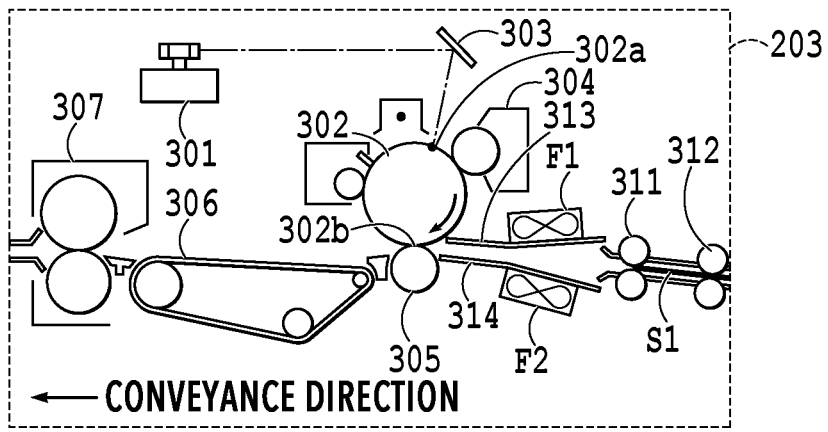
FIG. 3A to FIG. 3D are diagrams for explaining an internal configuration of an image forming unit and sheet overlap control in the image forming unit.
Figure 3B:
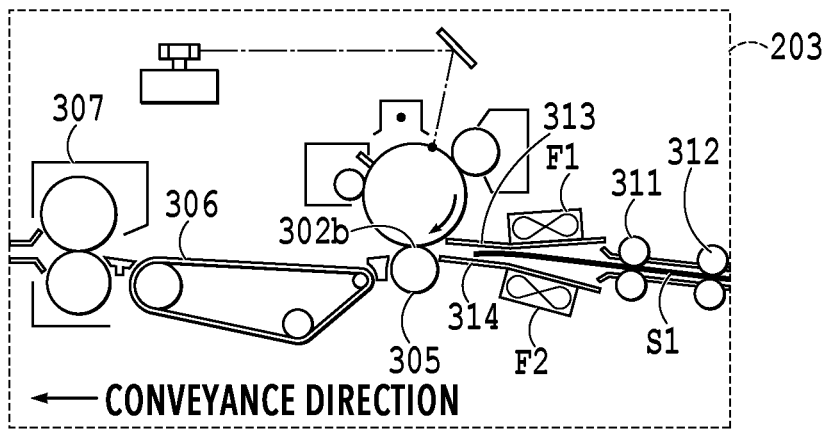
Figure 3C:
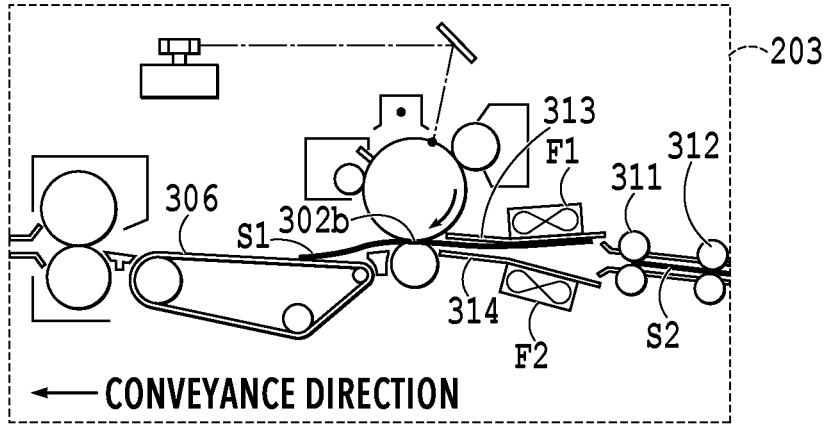
Figure 3D:
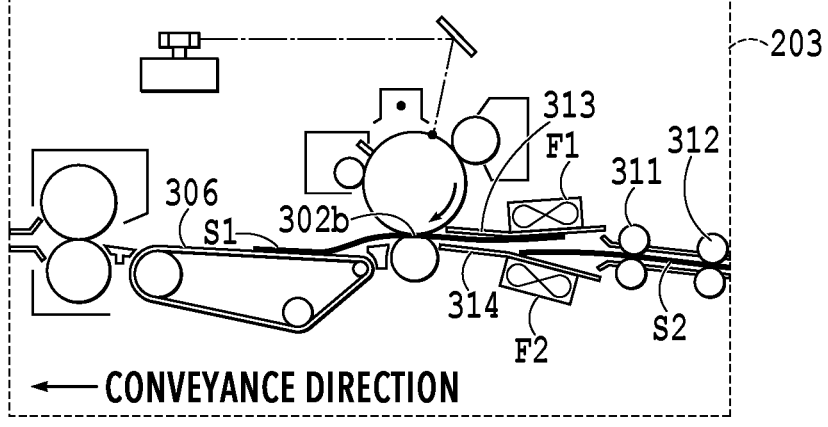

Here, the sheet overlap control by the controller 141 is explained in detail. First, the controller 141 controls the conveyance rollers 202A, 202B, and 202C and sends out a printing sheet S1 (hereinafter, described as sheet S1) from one of the sheet feed units 201A, 201B, and 201C. Then, the controller 141 sends the sheet S1 into the resisting roller 311 at rest by a pre-resisting roller 312. Due to this, as shown in FIG. 3A, the front end of the sheet S1 hits the resisting roller 311. Next, the controller 141 corrects the front end position and skew of the sheet S1 by suspending the rotation of the pre-resisting roller 312 after sending the sheet S1 by a predetermined amount by the pre-resisting roller 312. After correcting the front end position and skew, the controller 141 rotates the resisting roller 311 and sends the sheet S1 toward the transfer section 302b as shown in FIG. 3B. Then, the controller 141 turns on the upper side suction fan F1 at the time of the rear end portion of the sheet S1 (upstream side end portion in the sheet conveyance direction) being about to exit the resisting roller 311. Due to this, the rear end portion of the sheet S1 is sucked to the lower side surface of the conveyance guide 313 and adheres close to the lower side surface of the conveyance guide 313 as shown in FIG. 3C. Next, the controller 141 conveys the sheet S1 in a state where the rear end portion of the sheet S1 is caused to adhere close to the lower side surface of the conveyance guide 313. Further, at the same time, the controller 141 sends out a subsequent printing sheet S2 (hereinafter, described as sheet S2) from the resisting roller 311 at a speed higher than the sheet conveyance speed of the sheet S1. Due to this, as shown in FIG. 3D, the front end portion of the subsequent sheet S2 comes under the rear end portion of the preceding sheet S1.

In a case where the front end portion of the subsequent sheet S2 comes under the rear end portion of the preceding sheet S1 as described above, the controller 141 reduces the sheet conveyance speed of the resisting roller 311 to the same speed as the sheet conveyance speed of the preceding sheet S1 as well as turning off the suction fan F1. Due to this, the preceding sheet S1 and the subsequent sheet S2 are conveyed toward the transfer section 302b at the same sheet conveyance speed in a state where the rear end portion of the preceding sheet S1 overlaps the front end portion of the subsequent sheet S2 from above by a predetermined amount. By the process such as this, it is made possible to convey the preceding sheet S1 and the subsequent sheet S2 in a state where the rear end portion of the preceding sheet S1 overlaps the front end portion of the subsequent sheet S2. In the above-described example, the case is explained where the front end portion of the subsequent sheet S2 is caused to overlap the rear end portion of the preceding sheet S1 from under by operating the upper side suction fan F1. However, it may also be possible to cause the front end portion of the subsequent sheet S2 to overlap the rear end portion of the preceding sheet S1 from above by operating the lower side suction fan F2 similarly. Further, it may also be possible to selectively operate the suction fans F1 and F2 so that an overlapping state of printing sheets continuously conveyed can be selected arbitrarily. Here, it is possible to arbitrarily set the overlap amount of the sheets S1 and S2 by changing the period of time of the increased speed as well as increasing the sheet conveyance speed of the resisting roller 311 by changing the rotation speed of the resisting roller motor after the preceding sheet passes.

In the present embodiment, as will be described later, the control unit 110 scans each pixel of print image data (there is a case where simply represented as print data) and determines a non-print area, and derives an overlap amount of the sheets S1 and S2 based on the determination results and transmits the derived overlap amount to the printer unit 140. Then, the controller 141 of the printer unit 140 performs the sheet overlap control as described above based on the overlap amount received from the control unit 110.

Figure 4:
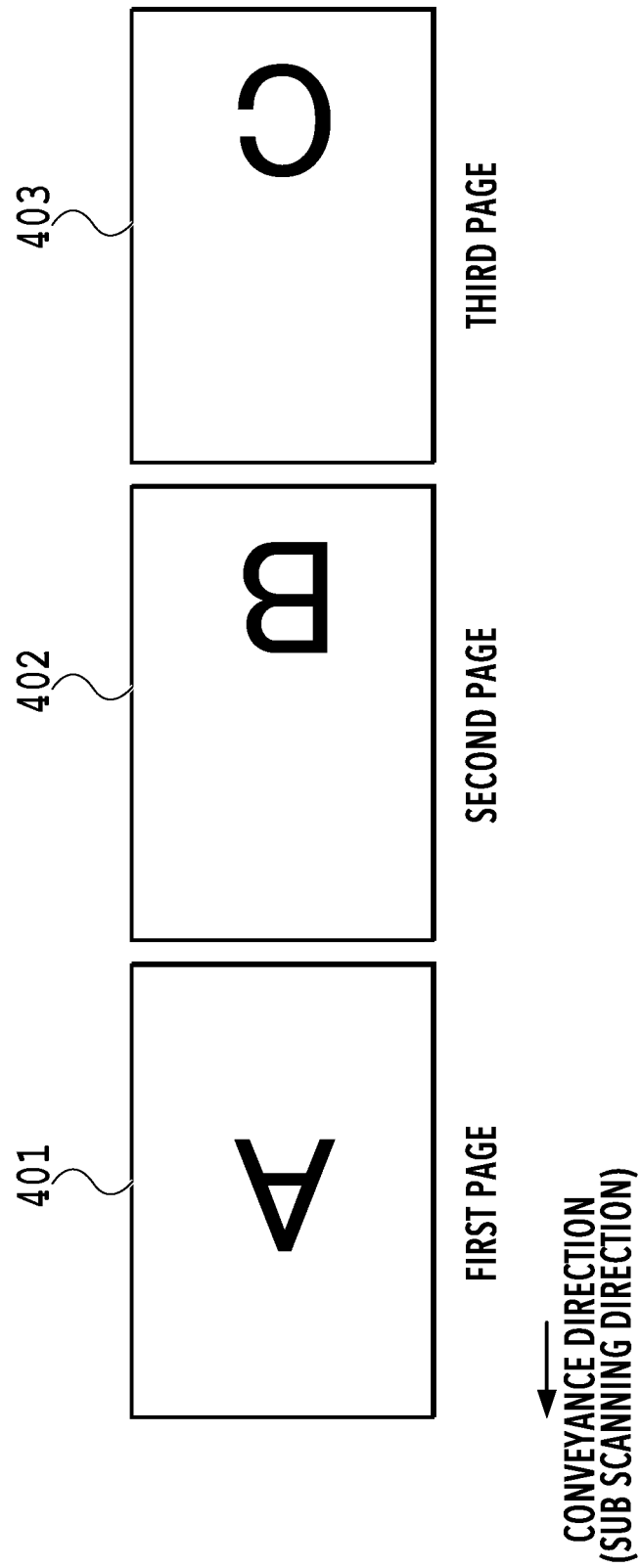
FIG. 4 is a diagram schematically showing an example of print image data corresponding to three pages loaded onto an image memory.

FIG. 4 is a diagram schematically showing an example of print image data corresponding to three pages, which is loaded onto the image memory 119. In the following, for simplification of explanation, a case where printing is performed with the 1 in 1 layout is taken as an example. The N in 1 layout is a layout setting in which N pages are printed on one printing sheet. Print image data 401 is image data that is printed on the first page and letter "A" of the alphabet is arranged at the center. Print image data 402 is image data that is printed on the second page and letter "B" of the alphabet is arranged at the rear end portion in the conveyance direction. Print image data 403 is image data that is printed on the third page and letter "C" of the alphabet is arranged at the rear end portion in the conveyance direction. In FIG. 4, the horizontal direction corresponds to the sub scanning direction and the conveyance direction and the vertical direction corresponds to the main scanning direction. Further, in FIG. 4, the left side corresponds to the front end side (downstream side) in the sub scanning direction. Consequently, the print image data 401, 402, and 403 are loaded onto the image memory 119 in the raster sequence from the line at the left end with the pixel at the bottom-left end in FIG. 4 as the top pixel.

Figure 5:
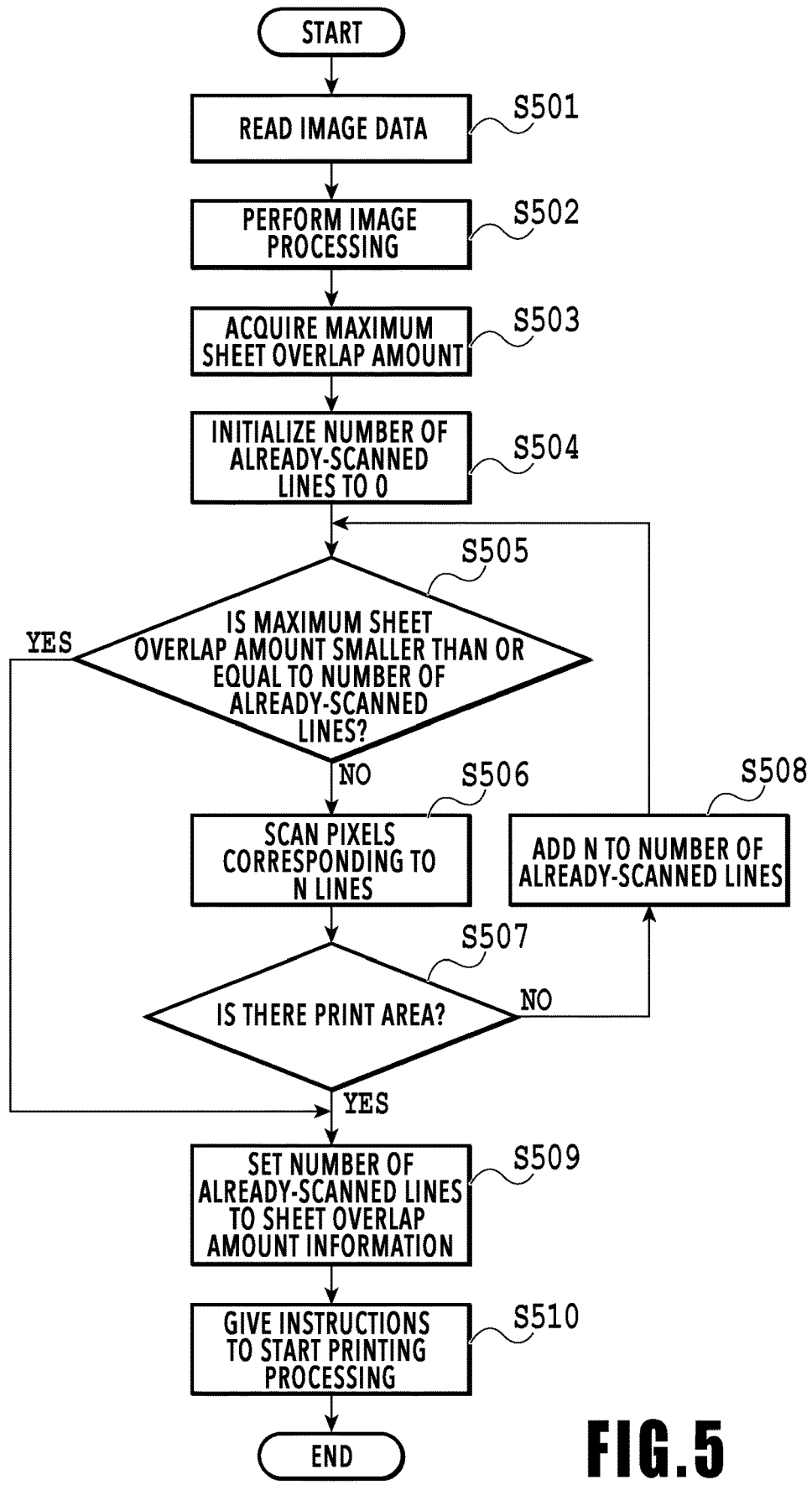
FIG. 5 is a flowchart showing a flow of processing of the first embodiment until a sheet overlap amount is derived from print image data and printing processing is started.

FIG. 5 is flowchart showing a flow of processing of the first embodiment until a sheet overlap amount is derived from print image data and printing processing is started. The flow shown in FIG. 5 is performed for each piece of print image data that is printed on each printing sheet. First, the control unit 110 reads print-target image data onto the image memory 119 from the storage unit 114 (step S501). It is assumed that image data (scanned image data) obtained by performing a scan by the scanner unit 130 and image data obtained by performing RIP for PDL data received through the network I/F 115 by the CPU 111 are saved in the storage unit 114. In a case where the scanned image data or the image data for which RIP has been performed is loaded onto the image memory 119 without saving them in the storage unit 114, the processing at step S501 is not necessary. Next, based on the print setting set by a user via the operation unit 150 or the like before execution of a print job, the control unit 110 performs image processing for the image data (print image data) read onto the image memory 119 at step S501 (step S502). In particular, the image processing that changes the pattern of an image, such as movement, enlargement, and reduction of an image, combination of a page number or a number of copies, combination of a stamp or a copy-forgery-inhibited pattern, and an N in 1 layout, is performed at this timing.

Next, the control unit 110 acquires the maximum sheet overlap amount (hereinafter, simply called maximum overlap amount) of the printer unit 140 (step S503). The maximum overlap amount is an example of a predetermined overlap amount used for determination processing at step S505 to be described later. The maximum overlap amount is the maximum value of the sheet overlap amount that can be permitted by the printer unit 140. In the present embodiment, the control unit 110 acquires the maximum overlap amount by making an inquiry to the printer unit 140. It may also be possible to store the maximum overlap amount in advance in the storage device, such as the RAM 112 and the storage unit 114, and for the control unit 110 to directly read the value stored in the storage device.

Next, the control unit 110 initializes a number of already-scanned lines to 0 (step S504). The number of already-scanned lines is information indicating the total number of lines for which processing at step S506, to be described later, has been performed. Next, the control unit 110 determines whether the number of already-scanned lines is larger than or equal to the maximum overlap amount of the printer unit 140 (step S505). As described previously, a determination value used at step S505 is not limit to the maximum overlap amount, that is, a predetermined overlap amount other than the maximum overlap amount may be used at step S505. In a case where the number of already-scanned lines is larger than or equal to the maximum overlap amount (YES at step S505), the processing advances to step S505. In a case where the number of already-scanned lines is less than the maximum overlap amount (NO at step S505), the control unit 110 scans the pixel value of each pixel of the print image data (print image data for which image processing has been performed at step S502) for N lines (step S506). Details of the scan of a pixel, which is performed at this time, will be described later by using FIG. 6. Then, the control unit 110 determines whether a print area is detected in the scanned N lines (step S507). In the present embodiment, it is assumed that N=1. In a case of determining that a print area is not detected (NO at step S507), the control unit 110 adds N to the number of already-scanned lines (step S508) and returns to the processing at step S505.

On the other hand, in a case of determining that a print area is detected (YES at step S507), the control unit 110 sets the number of already-scanned lines to the sheet overlap amount information (step S509) and transmits the sheet overlap amount information to the printer unit 140. Lastly, the control unit 110 transmits the print image data to the printer unit 140, together with instructions to start printing processing (step S510).

Upon receipt of the instructions to start printing processing, the printer unit 140 feeds a printing sheet from the sheet feed unit 201 and conveys the printing sheet to the image forming unit 203. At this time, the printer unit 140 starts sheet feed and conveyance of the printing sheet at timing in accordance with the sheet overlap amount specified in the received sheet overlap amount information. Then, the image forming unit 203 performs printing processing based on the received print image data for the conveyed printing sheet. In a case where a print setting for providing a margin at the end portion of a printing sheet is set, it is only required to start sheet feed and conveyance of the printing sheet by taking into consideration the amount of margin. For example, it is only required to start sheet feed and conveyance of the printing sheet at timing in accordance with the overlap amount obtained by adding the amount of margin specified in the print setting and the overlap amount specified in the sheet overlap amount information. Further, it may also be possible for the control unit 110 to set the number of lines obtained by adding the number of lines corresponding to the amount of margin specified in the print setting to the number of already-scanned lines to the sheet overlap amount information in step S509.

Figure 6:
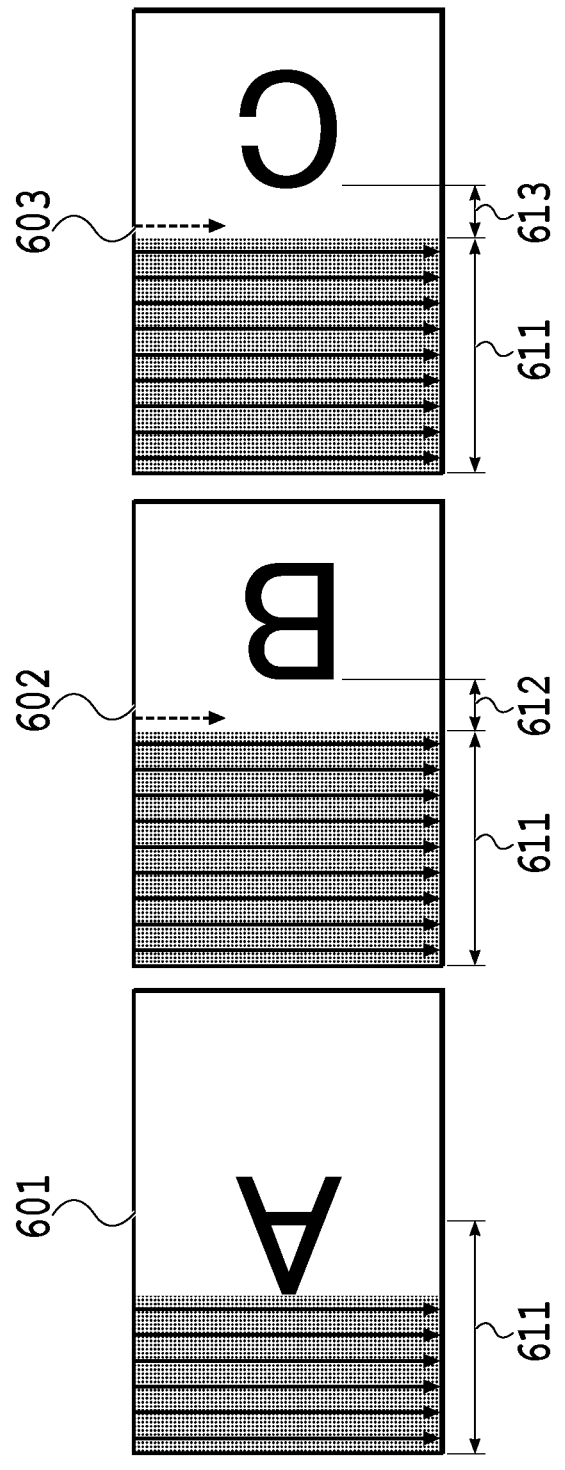
FIG. 6 is a diagram schematically showing the way each piece of print image data shown in FIG. 4 is analyzed in accordance with the flow shown in FIG. 5.

FIG. 6 is a diagram schematically showing the way each piece of print image data shown in FIG. 4 is analyzed (scanned) in accordance with the flow shown in FIG. 5. Here, it is assumed that a maximum overlap amount 611 of the printer unit 140 is equal to ½ of the sub scanning length of the printing sheet used for printing.

Single arrows in FIG. 6 show the way pixels are scanned. In FIG. 6, the single arrows are drawn with a space in between, but in fact, the scan is performed for each sub scanning line. However, it may also be possible to scan one line at intervals of several lines in order to increase the speed of analysis. The scan is performed in order from the front end side in the sub scanning direction (left side in FIG. 6). In FIG. 6, the scan is performed from the upper side toward the lower side in the main scanning direction, but the scan may be performed from the lower side toward the upper side. FIG. 4 and FIG. 6 show the way each printing sheet is conveyed by short edge feed (vertical feed) in which the short edge of the printing sheet is set perpendicular to the conveyance direction. However, it may also be possible to convey each printing sheet by long edge feed (horizontal feed) in which the long edge of the printing sheet is set perpendicular to the conveyance direction. In the long edge feed also, the scan is performed in order for one line each time from the front end side in the sub scanning direction.

The control unit 110 checks the pixel value of each pixel making up a line for each line. Then, the control unit 110 determines a pixel whose pixel value (each pixel value of CMYK in a case of a color image, the pixel value of K in a case of a monochrome image) is smaller than or equal to a predetermined value to be a non-print pixel. At this time, in a case where all pixels of one line (all pixels making up one line) are non-print pixels, the control unit 110 determines the line to be a non-print area. As the condition for determination of whether an area is a non-print area, another determination condition may be used.

The shaded areas in FIG. 6 are areas for which it is determined that printing sheets can overlap as results of the above-described scan (hereinafter, called overlap possible areas). By conveying each printing sheet in a state where a preceding printing sheet overlaps on the overlap possible area in each printing sheet, it is possible to reduce the conveyance time of printing sheets.

For print image data 601 of the first page, a print area is discovered before the number of lines of the maximum overlap amount 611 (maximum number of lines) is reached, and therefore, the area up to the line before the print area is determined to be the non-print area. For print image data 602 of the second page and print image data 603 of the third page, even in a case where the image is scanned until the maximum number of lines is reached, no print area is discovered, and therefore, the scan is terminated on the way. Consequently, the scan is no longer performed for the non-print areas (areas indicated by bidirectional arrows 612 and 613) after the line indicated by the broken-line single arrows in FIG. 6, and therefore, compared to a case where the scan is performed until the print area is found, the analysis time is reduced and the calculation resources, such as a CPU, are saved.

The first page is the top page and no preceding page exists, and therefore, it may also be possible not to perform an analysis for the print image data of the first page. Due to this, it is possible to further reduce the analysis time. Further, in the present embodiment, the aspect is explained in which the preceding sheet is overlapped on the subsequent sheet, but the opposite overlapping manner may be accepted, that is, it may also be possible to overlap the subsequent sheet on the preceding sheet. In such a case, it is only required to perform the scan from the rear end in the sub scanning direction (conveyance direction) in the flow shown in FIG. 5.

As explained above, in the present embodiment, in a case where it is determined that the sheet overlap amount cannot be increased any more even though the scan is continued, the scan is terminated at that point in time. Due to this, for example, in a case where print image data is white sheet data, the image analysis is not performed for the entire print image data but the image analysis is performed only within a predetermined range (in the present embodiment, within the image range determined in accordance with the maximum overlap amount). Due to this, it is possible to avoid an unnecessary image analysis from being performed, and therefore, it is possible to reduce the printing time more securely. Further, it is possible to save the calculation resources, such as a CPU, necessary for the image analysis.

Figure 7:
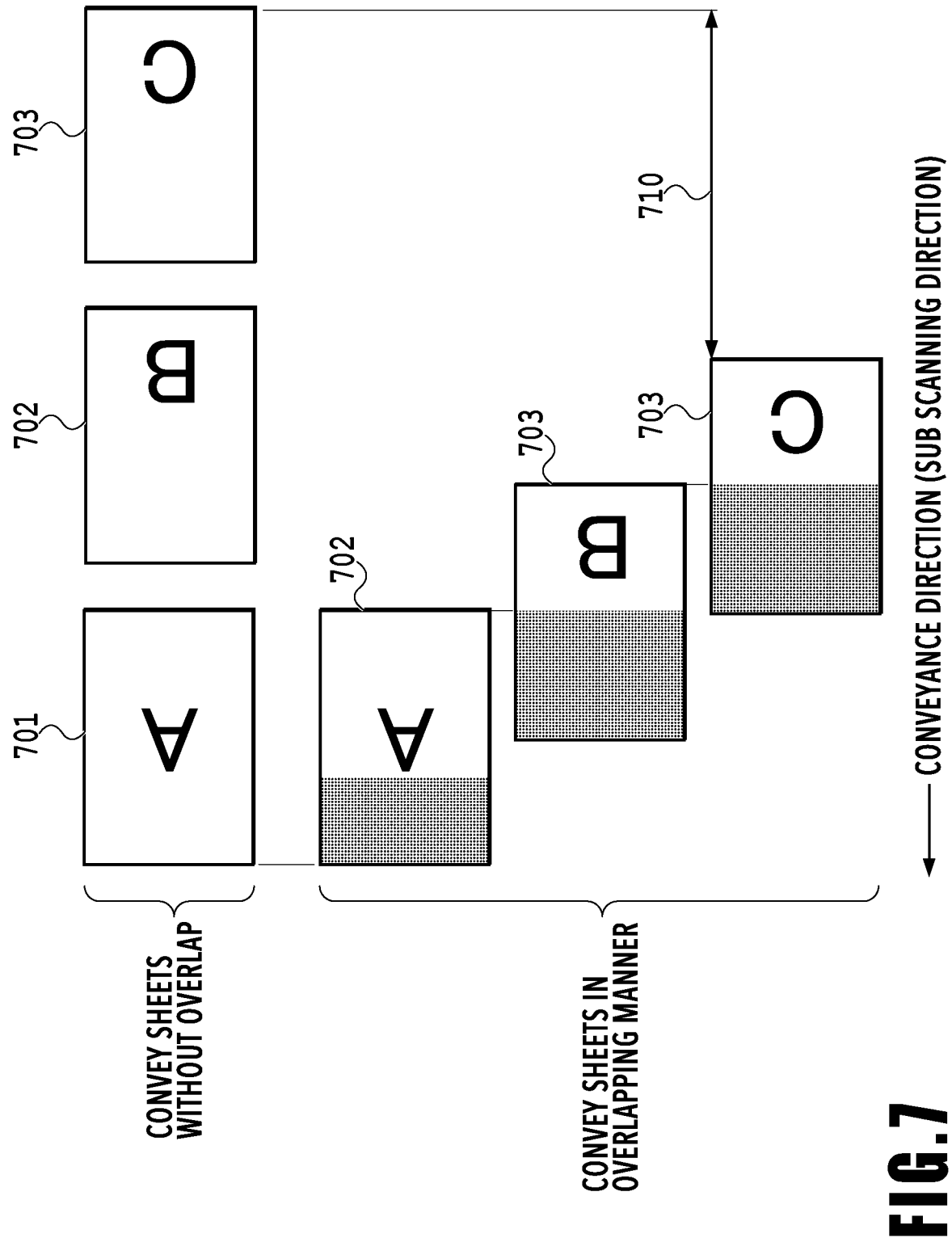
FIG. 7 is a diagram for explaining an effect of the first embodiment.

FIG. 7 is a diagram for explaining the effect of the first embodiment. FIG. 7 shows the way images are printed in order on printing sheets 701, 702, and 703 based on the print image data 401, 402, and 403 shown in FIG. 4. On the upper side in FIG. 7, an example of a case where printing is performed while conveying each printing sheet in accordance with the conventional conveyance method, that is, an example of a case where each printing sheet is conveyed one by one with a space in between is shown. On the lower side in FIG. 7, an example of a case where printing is performed while conveying each printing sheet in accordance with the conveyance method of the present embodiment, that is, an example of a case where printing is performed while conveying each printing sheet in a state of overlapping another printing sheet in accordance with the sheet overlap amount derived by the processing shown in FIG. 5 is shown. The shaded areas in FIG. 7 indicate the areas where the preceding sheet overlaps from above. As shown in FIG. 7, according to the conveyance method of the present embodiment, conveyance of printing sheets is completed earlier by a time corresponding to the length indicated by a bidirectional arrow 710 compared to the conventional conveyance method, and therefore, it is possible to reduce the printing time. Further, as described previously, in the image analysis for detecting a print area, lines are scanned only within the image range determined in accordance with the maximum overlap amount, and therefore, the printing time is further reduced.

Second Embodiment

There is a case where the number of overlapped printing sheets (number of printing sheets that can be conveyed in an overlapping manner) is limited to a predetermined number depending on the performance of a printer engine. The reason is that, for example, in a case where the image forming unit 203 adopts the electrophotographic method, on a condition that the number of overlapped printing sheets exceeds a predetermined number, it is necessary to raise the fixing temperature, and therefore, there is a possibility that the control of the fixing device 307 becomes complicated. Further, the reason is that, for example, in a case where the image forming unit 203 adopts the ink jet method, the distance between the print head and the printing sheet varies in accordance with the number of printing sheets that are overlapped, and therefore, there is a possibility that it is no longer possible to perform printing normally in a case where the number of overlapped printing sheets exceeds a predetermined number. Furthermore, the reason is that, for example, because of the structure of the conveyance path, it is necessary to suppress the number of overlapped printing sheets to a predetermined number or less. Consequently, in the present embodiment, conveyance control to convey printing sheets in such a manner that the number of overlapped printing sheets does not exceed a predetermined number (in the following, two) is explained.

Figure 8:
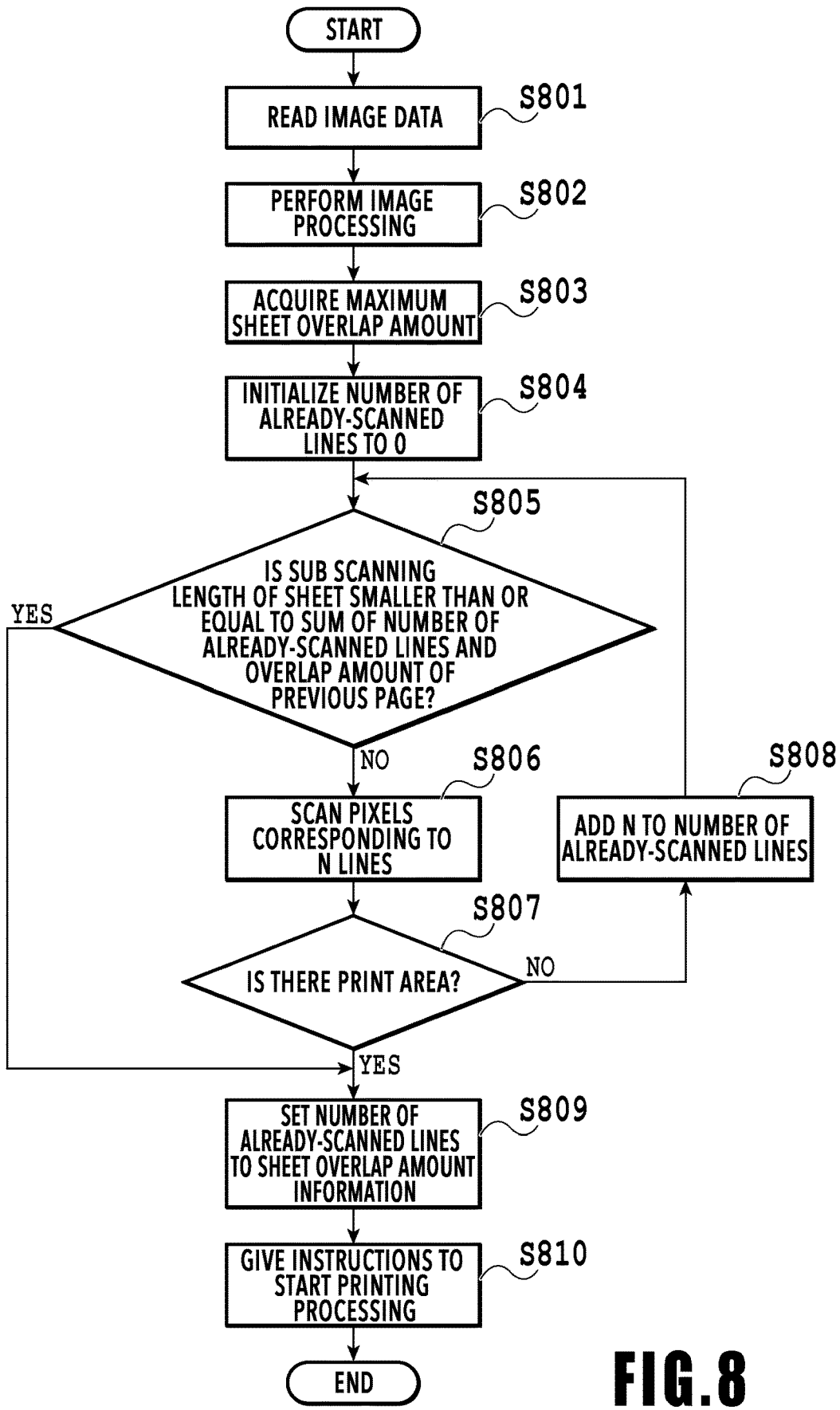
FIG. 8 is a flowchart showing a flow of processing of a second embodiment until a sheet overlap amount is derived from print image data and printing processing is started.

FIG. 8 is a flowchart showing a flow of processing of a second embodiment until a sheet overlap amount is derived from print image data and printing processing is started. The processing at steps S801 to S804 and S806 to S810 is the same as that at steps S501 to S504 and S506 to S510 shown in FIG. 5, and therefore, explanation is omitted.

After the processing at step S804, the control unit 110 determines whether the sum of the number of already-scanned lines and the overlap amount of the previous page (more specifically, the overlap amount derived from the print-target image data corresponding to the preceding sheet) is larger than or equal to the sub scanning length of the printing sheet (step S805). This determination is for determining whether a portion where three printing sheets overlap occurs at the time of conveying printing sheets in an overlapping manner.

In a case where the sum is larger than or equal to the sub scanning length (YES at step S805), the control unit 110 determines that it is not possible to increase the overlap amount even by continuing the scan and terminates the scan and advances to the processing at step S809. In a case where the sum is less than the sub scanning length (NO at step S805), the control unit 110 determines that there is a possibility that the overlap amount can further be increased by continuing the scan and advances to the processing at step S806. The processing at step S803 (acquisition processing of the maximum overlap amount) may be omitted in the present embodiment.

Figure 9:
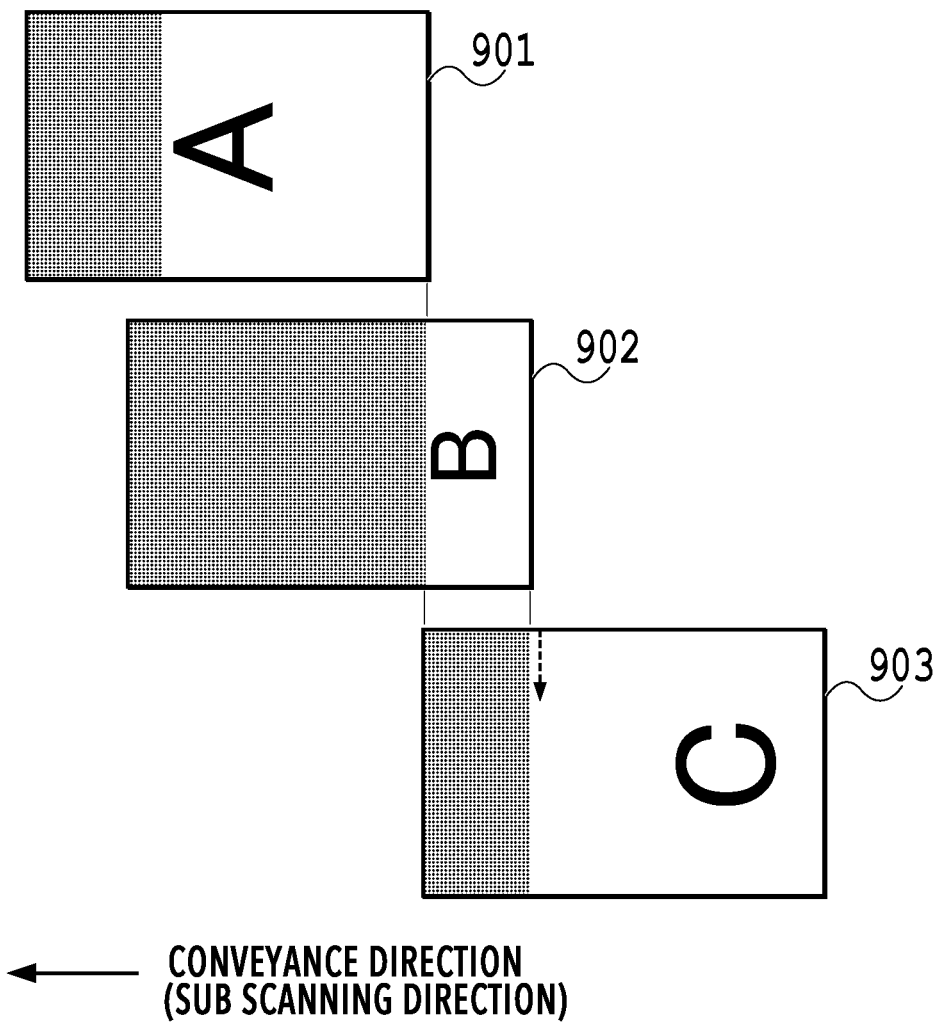
FIG. 9 is a diagram showing the way printing sheets are conveyed in accordance with conveyance control of the second embodiment.

FIG. 9 is a diagram showing the way printing sheets are conveyed in accordance with conveyance control of the second embodiment. FIG. 9 shows the way images are printed in order on printing sheets 901, 902, and 903 based on the print image data 401, 402, and 403 shown in FIG. 4. The shaded areas indicate the areas where the preceding printing sheet overlaps from above. Here, in order to make explanation simple, a case is explained where the maximum overlap amount is equal to the sub scanning length of the printing sheet.

In the example shown in FIG. 9, the overlap amount of the printing sheet 902 of the second page for the printing sheet 901 of the first page is large. Because of this, in a case where the printing sheet 903 of the third page is overlapped largely for the printing sheet 902 of the second page, an area where the printing sheet 901 of the first page and the printing sheet 903 of the third page overlap occurs. At this time, the area enters a state where the printing sheets 901, 902, and 903 overlap, that is, a state where the three printing sheets overlap. Because of this, for the printing sheet 903 of the third page, it is only possible to increase the overlap amount up to the position where the printing sheet 903 does not overlap the printing sheet 901 of the first page. Consequently, it is sufficient to scan the pixel in a range where the three printing sheets do not overlap (up to the line before the broken-line arrow). Because of this, as described previously, in the present embodiment, the scan is terminated at the timing at which the scan of the number of lines is completed, which is obtained by subtracting the overlap amount of the previous page from the number of lines corresponding to the sub scanning length of the printing sheet.

As above, in the present embodiment, the determination at step S805 is performed under the determination condition in accordance with the number of overlapped printing sheets limited by the performance of the printer engine. Due to this, in the printing processing to perform printing while conveying printing sheets in an overlapping manner, the same effect as that of the first embodiment is obtained and at the same time, it is made possible to perform conveyance and printing suitable to the performance of the printer engine.

Further, in the above-described embodiment, the case is explained where the MFP including the scanner unit 130 is used as the image forming apparatus. However, it may also be possible to use, for example, an SFP (Single Function Peripheral) not including the scanner unit 130 as the image forming apparatus according to the present embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to more securely reduce the printing time of printing processing to perform printing while conveying printing sheets in an overlapping manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-254148, filed Dec. 28, 2017, which is hereby incorporated by reference wherein in its entirety.

What is claimed is:

1. An image forming apparatus capable of conveying a plurality of printing sheets in an overlapping manner to a printing unit, the image forming apparatus comprising:
   a determination unit configured to analyze print data for printing an image on one printing sheet and to determine, based on the analysis results, an overlap amount of the one printing sheet and another printing sheet conveyed in a state of overlapping part of the one printing sheet; and
   a conveyance unit configured to convey the one printing sheet and the other printing sheet in an overlapping manner in accordance with an overlap amount determined by the determination unit, wherein
   a target image range of the analysis of the print data is determined in accordance with a predetermined overlap amount determined in advance, which the printing unit can permit.

2. The image forming apparatus according to claim 1, wherein
   an image range corresponding to a number of lines indicated by the predetermined overlap amount, which is continuous from an end portion in a sub scanning direction of the print data, is determined as a target of the analysis.

3. The image forming apparatus according to claim 2, wherein
   the predetermined overlap amount is a number of lines determined in advance.

4. The image forming apparatus according to claim 2, wherein
   the predetermined overlap amount is a number of lines obtained by subtracting an overlap amount of the one printing sheet and a printing sheet conveyed prior to the one printing sheet from a number of lines corresponding to a sub scanning length of a printing sheet.

5. The image forming apparatus according to claim 1, wherein
   the other printing sheet is a printing sheet conveyed prior to the one printing sheet and a printing sheet conveyed in a state of overlapping on the one printing sheet, and
   the determination unit scans each pixel of the print data for each line from an end portion on an upstream side in a sub scanning direction and determines a number of already-scanned lines at a point in time at which a print area in which a pixel value larger than a predetermined value is detected as an overlap amount of the one printing sheet and the other printing sheet.

6. The image forming apparatus according to claim 1, wherein
   the other printing sheet is a printing sheet conveyed following the one printing sheet and a printing sheet conveyed in a state of overlapping on the one printing sheet, and
   the determination unit scans each pixel of the print data for each line from an end portion on a downstream side in a sub scanning direction and determines a number of already-scanned lines at a point in time at which a print area in which a pixel value larger than a predetermined value is detected as an overlap amount of the one printing sheet and the other printing sheet.

7. The image forming apparatus according to claim 5, wherein
   the determination unit terminates the analysis in a case where the number of already-scanned lines reaches a number of lines indicated by the predetermined overlap amount before the print area is detected in the analysis of the print data.

8. The image forming apparatus according to claim 1, wherein
   the determination unit performs image processing in accordance with a print setting for the print data and performs the analysis for the print data for which the image processing has been performed.

9. A control apparatus in an image forming apparatus capable of conveying printing sheets in an overlapping manner in accordance with a specified overlap amount to a printing unit, the control apparatus comprising:

a determination unit configured to analyze print data for printing an image on one printing sheet and to determine, based on the analysis results, an overlap amount of the one printing sheet and another printing sheet conveyed in a state of overlapping part of the one printing sheet; and a specification unit configured to specify an overlap amount determined by the determination unit to the printing unit, wherein a target image range of the analysis of the print data is determined in accordance with a predetermined overlap amount determined in advance, which the printing unit can permit.

10. A control method in an image forming apparatus capable of conveying printing sheets in an overlapping manner to a printing unit, the method comprising the steps of:

analyzing print data for printing an image on one printing sheet and determining, based on the analysis results, an overlap amount of the one printing sheet and another printing sheet conveyed in a state of overlapping part of the one printing sheet; and conveying the one printing sheet and the other printing sheet in an overlapping manner in accordance with the determined overlap amount, wherein a target image range of the analysis of the print data is determined in accordance with a predetermined overlap amount determined in advance, which the printing unit can permit.

11. A non-transitory computer readable storage medium storing a program for causing a computer to perform a control method in an image forming apparatus capable of conveying printing sheets in an overlapping manner to a printing unit, the method comprising the steps of:

analyzing print data for printing an image on one printing sheet and determining, based on the analysis results, an overlap amount of the one printing sheet and another printing sheet conveyed in a state of overlapping part of the one printing sheet; and conveying the one printing sheet and the other printing sheet in an overlapping manner in accordance with the determined overlap amount, wherein a target image range of the analysis of the print data is determined in accordance with a predetermined overlap amount determined in advance, which the printing unit can permit.

* * * * *